(12) United States Patent
Gao et al.

(10) Patent No.: US 9,133,060 B2
(45) Date of Patent: Sep. 15, 2015

(54) CHEMICAL ADDITIVE FOR GYPSUM PRODUCTS

(71) Applicant: SAINT-GOBAIN PLACO, Suresnes (FR)

(72) Inventors: Xiaotong Gao, Shanghai (CN); Dongxiao Shao, Shanghai (CN); Huifen Li, Shanghai (CN); Hao Song, Shanghai (CN); Ke Zhang, Shanghai (CN)

(73) Assignee: Saint-Gobain Placo, Suresnes (FR)

( * ) Notice: Subject to any disclaimer, the term of this patent is extended or adjusted under 35 U.S.C. 154(b) by 0 days.

(21) Appl. No.: 14/379,700

(22) PCT Filed: Dec. 3, 2012

(86) PCT No.: PCT/CN2012/085748
§ 371 (c)(1),
(2) Date: Aug. 19, 2014

(87) PCT Pub. No.: WO2014/085961
PCT Pub. Date: Jun. 12, 2014

(65) Prior Publication Data
US 2015/0007753 A1     Jan. 8, 2015

(51) Int. Cl.
| | |
|---|---|
| C04B 11/00 | (2006.01) |
| C04B 28/14 | (2006.01) |
| C04B 26/28 | (2006.01) |
| B28B 1/30 | (2006.01) |
| B28B 17/00 | (2006.01) |
| C01F 11/46 | (2006.01) |
| C04B 111/40 | (2006.01) |

(52) U.S. Cl.
CPC ............... *C04B 26/285* (2013.01); *B28B 1/30* (2013.01); *B28B 17/0036* (2013.01); *C01F 11/46* (2013.01); *C04B 11/00* (2013.01); *C04B 28/14* (2013.01); *C04B 2111/40* (2013.01)

(58) Field of Classification Search
CPC .......... C04B 11/00; C04B 24/06; C04B 28/14
USPC ............................................ 106/778; 156/39
See application file for complete search history.

(56) References Cited

U.S. PATENT DOCUMENTS

| | | | |
|---|---|---|---|
| 6,342,284 B1 | 1/2002 | Yu et al. | |
| 6,541,545 B1 * | 4/2003 | Simmons et al. | 523/509 |
| 6,566,434 B1 | 5/2003 | Mayer et al. | |
| 2002/0037314 A1 * | 3/2002 | Meisner | 424/449 |
| 2010/0303888 A1 * | 12/2010 | Barralet et al. | 424/425 |
| 2012/0088114 A1 | 4/2012 | Vincent et al. | |

FOREIGN PATENT DOCUMENTS

| | | |
|---|---|---|
| CN | 1237148 A | 12/1999 |
| CN | 1307547 A | 8/2001 |
| CN | 101747014 A | 6/2010 |
| CN | 1400958 A | 4/2011 |
| CN | 102276227 A | 12/2011 |
| GB | 1226333 A | 3/1971 |
| GB | 1481788 A | 8/1977 |
| GB | 191413542 | 12/2014 |

OTHER PUBLICATIONS

IP Australia, Australian Search Report dated May 22, 2014, for Application No. 2012387288, 6 pages.
Taiwan Intellectual, Property Office, First Office Action dated May 7, 2015, 5 pages.

* cited by examiner

*Primary Examiner* — Anthony J Green
(74) *Attorney, Agent, or Firm* — Dorsey & Whitney LLP

(57) ABSTRACT

The present invention provides a gypsum composition, a gypsum board and their preparation method and the use of DHA as an anti-sagging additive in a gypsum product. Said gypsum board comprises set gypsum prepared from the composition; while said composition comprises gypsum, and an anti-deformation additive, wherein the anti-deformation additive comprises at least one selected from a group consisting of dehydroascorbic acid, dehydroascorbate and semidehydroascorbic acid. The set gypsum prepared from the said composition shows better anti-sagging or deformation resisting property. The gypsum product of the present invention is hardly distorted and has stronger stability even in the condition of high humidity, thus improve the quality of the gypsum product to meet the demands of the customer.

20 Claims, No Drawings

CHEMICAL ADDITIVE FOR GYPSUM PRODUCTS

CROSS-REFERENCE TO RELATED APPLICATIONS

The present application is a Section 371 National Stage Application of International Application No. PCT/CN2012/085748, filed on Dec. 3, 2012, which is incorporated by reference in its entirety.

FIELD OF THE DISCLOSURE

The present invention relates to a gypsum product, in particular to a gypsum composition, a gypsum board and their preparation methods and the use of dehydroascorbic acid (DHA) as an anti-sagging additive in a gypsum product.

BACKGROUND OF THE DISCLOSURE

In the field of modern architecture, gypsum (main component being calcium sulfate dihydrate) is a major material used in the construction industry. Examples include a gypsum board for forming the ceilings and walls in a building, and conventional mortar for producing a finished surface on the internal ceilings/walls.

During the preparation of gypsum products, a mixture of calcined gypsum (calcium sulfate hemihydrate and/or anhydrous calcium sulfate) and water is cast, where the calcined gypsum (plaster) is hydrated by water to form a solidified gypsum which comprises crystalline hydrated gypsum matrix (calcium sulfate dihydrate), so that the gypsum products have high structural strength. Thus, the gypsum product has advantages of light weight and high strength and so is widely used in building products.

However, if the gypsum product is under conditions of high humidity for a long time, deformation behavior can occur, at times referred to as sagging or humidified deflection in the industry. Gypsum products that show this deformation behavior will present poor aesthetics after installation and will require expensive remediation work to correct. Therefore, how to overcome the poor deformation behavior of solidified gypsum has been the focus of study in the field of construction, and some achievements have been made.

For example, Chinese patent publication No. CN101747014A discloses a method to improve the anti-sagging of the gypsum product by adding boric acid as additives into the calcined gypsum. U.K. patent GB1481788A discloses using Gallic acid as anti-sagging additive in order to improve anti-sagging of a gypsum board. U.K. patent GB 1226333A discloses that precast gypsum plaster sheets, slabs and blocks containing tartaric acid have a greater resistance to plastic flow than similar articles not containing tartaric acid. It is also known that phosphates can be used as disclosed in U.S. Pat. No. 6,342,284.

SUMMARY

In view of the behavior that the prior gypsum products are prone to sagging and creeping under humid conditions and thus have poor resistance to deformation and in turn poor stability, the present invention provides a gypsum composition and a gypsum board and preparation method for the gypsum board. Said composition comprises anti-deformation additives, and the gypsum board made of said composition has good anti-deformation ability, especially the anti-sagging ability, under humid high temperature conditions, thus the stability of the gypsum product is improved.

The present invention provides a gypsum composition, a gypsum board and their preparation method and the use of DHA as an anti-sagging additive in the gypsum product.

Said composition comprises gypsum and an anti-deformation additive; said anti-deformation additive comprises at least one selected from a group consisting of dehydroascorbic acid, dehydroascorbate and semidehydroascorbic acid (MDHA, also stands for monodehydroascorbic acid which has the same composition as semidehydroascorbic acid). Said gypsum mentioned in composition of this application is hemi-hydrate gypsum (calcium sulfate hemi-hydrate).

The present invention further provides a method for forming the composition, comprising: mixing gypsum powder and an anti-deformation additive with water; and stirring the mixture, wherein the anti-deformation additive comprises at least one selected from a group consisting of dehydroascorbic acid, dehydroascorbate and MDHA.

Optionally, the composition further comprises one or more components selected from gypsum, starch, foaming agent, accelerator, dispersant, and the like known to skilled person in the art of gypsum board and plaster manufacture, as auxiliary additive.

The present invention further provides a gypsum board, comprising, gypsum, starch, foaming agent (optionally), dispersant, accelerator and an anti-deformation additive, and materials known to skilled persons in the art of gypsum board and plaster manufacture, wherein the anti-deformation additive comprises at least one selected from a group consisting of dehydroascorbic acid, dehydroascorbate and MDHA. Said gypsum mentioned in the final gypsum board of this application is dihydrate gypsum (calcium sulfate dihydrate).

The present invention further provides a method for forming a gypsum board, comprising: mixing gypsum, water, starch, a foaming agent (optionally), an accelerator, a dispersant, and an anti-deformation additive, wherein the anti-deformation additive comprises at least one selected from a group consisting of dehydroascorbic acid, dehydroascorbate and MDHA; stirring the mixture to form a slurry; disposing the slurry between two liners to form a sandwich structures; forming a first board based on the sandwich structure; cutting the first board into a plurality of second boards with desired lengths after a hardening process; drying the plurality of second boards to evaporate excess water.

The slurry is typically deposited on a liner such as a paper sheet, non-woven mat comprising of polymeric and/or glass fibers and the like, and is covered with a further liner, such that the slurry is sandwiched between the two liners. This sandwich structure is then passed through a pair of forming plates or rolls that determine the thickness of the board. After this, the structure passes along a conveyor line, to allow time for the stucco slurry to hydrate and harden. The hardened structure is cut to provide multiple boards of the desired length and these are transferred to a drying system to allow excess water to evaporate.

The present invention also provides the use of DHA as anti-sagging additive in a gypsum product.

Optionally, the anti-deformation additive is dehydroascorbic acid.

Optionally, a mass percentage of the anti-deformation additive to the gypsum, in the composition and gypsum product, ranges from 0.01 to 5.0%. Preferably the minimum value of the content of the anti-deformation additive is 0.1%. Preferably the maximum value of the content of the anti-deformation additive is 1.0%.

Compared to the prior art, the composition, gypsum board and the preparation thereof have the following advantages. In the invention, said gypsum board comprises set gypsum prepared from the composition; while said composition comprises hemi-hydrate gypsum and an anti-deformation additive, wherein the anti-deformation additive comprises at least one selected from a group consisting of dehydroascorbic acid, dehydroascorbate and MDHA. The set gypsum prepared from the said composition shows better anti-deformation performance and improved anti-deformation property of the gypsum product efficiently than the prior art. The gypsum product of the present invention is hardly distorted and has stronger stability even in the condition of high humidity, thus improve the quality of the gypsum product to meet the requests of high stability.

DETAILED DESCRIPTION OF THE DISCLOSURE

As discussed in the background art, set gypsum has advantages of light weight and high structure strength, and has been widely used in gypsum products in architecture industry. However, it have been discovered in practice that, gypsum product with set gypsum as main component will occur sagging and creeping when exposed to high humidity, i.e. the prior gypsum product have poor anti-deformation ability under high moisture condition. The behavior affects the appearance of gypsum product, making unable to meet the gypsum product standards.

To solve the defect of poor anti-deformation ability and poor stability of prior gypsum, the present invention provides a composition and a gypsum board made of the composition and their preparation methods. The gypsum board made of the composition of the invention has significantly improved anti-deformation ability (in particular anti-sagging ability), compared with prior art.

The composition of the present invention comprises gypsum, water and an anti-deformation additive. The anti-deformation additive comprises at least one selected from a group consisting of dehydroascorbic acid, dehydroascorbate and MDHA. Said gypsum mentioned in composition is hemi-gypsum (calcium sulfate hemi-hydrate).

Specifically, the anti-deformation additive is dehydroascorbic acid (DHA). The chemical formula of dehydroascorbic acid (C6H6O6) is shown as the following:

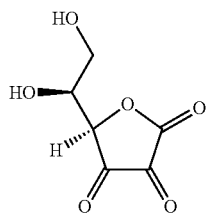

wherein, the mass ratio of the anti-deformation additive to the hemi-hydrate gypsum in the composition ranges from 0.01% to 5.0%, preferably from 0.1% to 1.0%.

In order to improve the quality of the gypsum board made of the composition, the composition may further comprise one or more additives selected from foaming agent, dispersant, accelerator and starch. The preparation method of the composition comprises: mixing gypsum powder and an anti-deformation additive in a specific ratio with water; and stirring the mixture, wherein the anti-deformation additive comprises at least one selected from a group consisting of dehydroascorbic acid, dehydroascorbate and MDHA. Thereby, the composition of the present invention can be obtained, and the operation process is simple thus large-scale industrial promotion is possible.

The present invention also provides a gypsum board made of above-mentioned composition, the components of the gypsum product in particular comprising starch, foaming agent, dispersant, accelerator and anti-deformation additive comprising at least one selected from a group consisting of dehydroascorbic acid, dehydroascorbate and MDHA. The gypsum mentioned in final gypsum board is dihydrate gypsum.

Wherein, the final product may be gypsum board, and the periphery of the gypsum board can be coated by a liner such as paper sheet, non-woven mat comprising of polymeric and/or glass fibers and the like to form a gypsum product with specific shape and use.

In the production process of the gypsum board, first, gypsum, starch, a foaming agent, an accelerator, a dispersant, an anti-deformation additive comprising at least one selected from a group consisting of dehydroascorbic acid, dehydroascorbate and MDHA, and materials known to skilled person in the art of gypsum board and plaster manufacture, are mixed in water and stifling the mixture to form a slurry; then the slurry is typically deposited on a liner such as a paper sheet, non-woven mat comprising of polymeric and/or glass fibers and the like, and is covered with a further liner, such that the slurry is sandwiched between the two liners. This sandwich structure is then passed through a pair of forming plates or rolls that determine the thickness of the board. After this, the structure passes along a conveyor line, to allow time for the stucco slurry to hydrate and harden. The hardened structure is cut to provide multiple boards of the desired length and these are transferred to a drying system to allow excess water to evaporate.

To make the above-mentioned purpose, features and advantages of the present invention more obvious and easy to understand, specific embodiments of the invention are used to further illustrate the composition and gypsum product of this invention and their preparation method and excellent anti-sagging performance of the gypsum product obtained by the invention.

More specific details are described in the following description in order to fully understand the present invention. However, the present invention can also be implemented by other means than as described here. Thus, the present invention is not constructed as limited by the following specific embodiments.

EXAMPLE

I. Preparation process of the examples and comparative examples are as follows:

Mix a specific quantity of additive powder (the additives here are only additives in examples and comparative examples shown in Table 1) and 500 g of calcined calcium sulfate hemihydrate powder with 350 g of water, and stir the mixture for 15 s to produce a plurality of slurries containing different additives correspondingly.

The obtained slurries are poured into individual moulds (all the moulds are the same) to prepare gypsum plates, each having dimensions of 400×400×10 mm, after 12 hours. the molded gypsum plates are removed and dried at 50~70° C. for 10~15 hours, and then dried at 30~50° C. for 20~30 hours in sequence to produce a plurality of gypsum plate samples corresponding to different additives to be tested. The obtained gypsum plates are cut into 320×40×10 mm after conditioning for 24 hours at a temperature of 20° C. and relative humidity of 50% RH for anti-sagging test.

II. Process of anti-sagging test:

Test environment: constant temperature 20±0.5° C.; relative humidity: 93±3% RH.

Each gypsum plate is then laid in a horizontal position upon two supports and the distance between two supports is 300 mm. A metal loading block (its mass is shown in Table 1 below) is placed at the central part of the gypsum plate to accelerate the sag process. During a period of 24 hour, the sag distance of the central part of gypsum plate samples is continuously measured by a laser displacement meter (model: Keyence IL-065), and the final sag distance of each gypsum plate sample is recorded after 24 hours.

Components in the example and comparative example, and test data of corresponding gypsum plate of example and comparative example are shown in Table 1:

TABLE 1

Table of sagging resistance test data of gypsum plate samples

| Sample | Additive | Content of Additive (%) | Sag deflection after 24 hours (mm) | Mass of the loading block (g) |
|---|---|---|---|---|
| Inventive sample | Dehydro-ascorbic acid | 0.1 | 0.17 | 500 |
| Comparative example | Control (no additive) | 0 | 0.38 | 500 |

The content of additive is the mass of the additive in each example/the mass of calcium sulfate hemihydrate.

III. Analysis of test results: From the sag deflections after 24 hours (as shown in Table 1), we can find that the introduction of 0.1 wt % DHA enhances the anti-sagging property of gypsum sample significantly.

Also, based on the especially good sagging resistance of gypsum plate with DHA as the additive, gypsum plates containing dehydroascorbate and MDHA with similar structure to DHA as their precursor also show quite good sagging resistance. As recorded in example 1, compared to existing gypsum products, the gypsum product containing anti-deformation additive comprising at least one selected from a group consisting of dehydroascorbic acid, dehydroascorbate and MDHA has significantly improved sagging resistance, and the gypsum product made by the anti-deformation in which the mass ratio of the anti-deformation and hemi-hydrate gypsum ranging from 0.01% to 5.0% has quite high sagging resistance, and in this range, the mass ratio of the anti-deformation and hemi-hydrate gypsum prefers 0.1~1.0%.

The present invention also provides the application of the DHA as an anti-sagging additive in the gypsum product. Anti-sagging additives in any forms comprising DHA and the application of the additives in prevent sagging of the gypsum product are with the protection of the present invention.

The preferred embodiments disclosed hereinbefore should not be construed as limiting the present invention, any technicians in this field could make possible changes within the spirit and scope of the invention, therefore the protection scope of present invention should be defined by the claims.

What is claimed is:

1. A gypsum composition, comprising gypsum and an anti-deformation additive, wherein the anti-deformation additive is selected from dehydroascorbic acid, dehydroascorbate, semidehydroascorbic acid, or combinations thereof, wherein a mass percentage of the anti-deformation additive ranges from 0.01% to 5% of the mass of the gypsum, and wherein the gypsum composition decreases sag in a wallboard made from the gypsum composition.

2. The composition according to claim 1, wherein the anti-deformation additive is dehydroascorbic acid.

3. The composition according to claim 1, wherein a mass percentage of the anti-deformation additive ranges from 0.1% to 5% of the mass of the gypsum.

4. The composition according to claim 2, wherein a mass percentage of the anti-deformation additive ranges from 0.1% to 5% of the mass of the gypsum.

5. A method for forming a gypsum composition, comprising:
mixing gypsum powder and an anti-deformation additive with water; and
stirring the mixture,
wherein the anti-deformation additive is selected from dehydroascorbic acid, dehydroascorbate, semidehydroascorbic acid, or combinations thereof, wherein a mass percentage of the anti-deformation additive ranges from 0.01% to 5% of the mass of the gypsum, and wherein the gypsum composition decreases sag in a wallboard made from the gypsum composition.

6. The method according to claim 5, wherein a mass percentage of the anti-deformation additive ranges from 0.1% to 5.0% of the mass of the gypsum powder.

7. A gypsum board, comprising:
gypsum, starch, dispersant, accelerator, and an anti-deformation additive,
wherein the anti-deformation additive is selected from dehydroascorbic acid, dehydroascorbate, semidehydroascorbic acid, or combinations thereof.

8. The gypsum board according to claim 7, wherein the anti-deformation additive is dehydroascorbic acid.

9. The gypsum board according to claim 7, wherein a mass percentage of the anti-deformation additive ranges from 0.01% to 5.0% of the mass of the gypsum.

10. The gypsum board according to claim 8, wherein a mass percentage of the anti-deformation additive ranges from 0.01% to 5.0% of the mass of the gypsum.

11. The gypsum board according to claim 7, wherein the mixture further comprises a foaming agent.

12. The gypsum board according to claim 11, wherein the anti-deformation additive is dehydroascorbic acid.

13. The gypsum board according to claim 11, wherein a mass percentage of the anti-deformation additive ranges from 0.01% to 5.0% of the mass of the gypsum.

14. The gypsum board according to claim 13, wherein a mass percentage of the anti-deformation additive ranges from 0.01% to 5.0% of the mass of the gypsum.

15. A method for forming a gypsum board, comprising:
mixing gypsum, water, starch, an accelerator, a dispersant, and an anti-deformation additive to form a mixture,
wherein the anti-deformation additive is selected from dehydroascorbic acid, dehydroascorbate, semidehydroascorbic acid, or combinations thereof;
stirring the mixture to form a slurry;
disposing the slurry between two liners to form a sandwich structure;
forming a first board based on the sandwich structure;
cutting the first board into a plurality of second boards after a hardening process;
drying the plurality of second boards to evaporate excess water.

16. The method according to claim 15, wherein a mass percentage of the anti-sagging additive ranges from 0.01% to 5.0% of the mass of the gypsum.

17. The method according to claim 15, wherein the mixture further comprises a foaming agent.

18. The method according to claim 17, wherein a mass percentage of the anti-sagging additive ranges from 0.01% to 5.0% of the mass of the gypsum.

19. A method for using dehydroascorbic acid in a gypsum product comprising,
- mixing water, dehydroascorbic acid, and gypsum to form a mixture, wherein a mass percentage of the dehydroascorbic acid ranges from 0.01% to 5.0% of the mass of the gypsum;
- forming the mixture into a gypsum product, wherein the dehydroascorbic acid is utilized as an anti-sagging additive in the gypsum product.

20. A method of making a wallboard or a gypsum board comprising:
- mixing gypsum powder and an anti-deformation additive with water to form a gypsum composition;
- stirring the mixture, wherein the anti-deformation additive is selected from dehydroascorbic acid, dehydroascorbate, semihydroascorbic acid, or combinations thereof, wherein a mass percentage of the anti-deformation additive ranges from 0.01% to 5% of the mass of the gypsum, and wherein the gypsum composition decreases sag in a wallboard or a gypsum board made from the gypsum composition; and
- disposing the mixture between two liners to form a board.

* * * * *